(12) United States Patent
Gao et al.

(10) Patent No.: US 11,902,694 B2
(45) Date of Patent: Feb. 13, 2024

(54) METHOD AND APPARATUS FOR MAKING GHOSTING SPECIAL EFFECT FOR MOVIE, AND ELECTRONIC DEVICE AND MEDIUM

(71) Applicant: JUPITER PALACE PTE. LTD., Singapore (SG)

(72) Inventors: Jiahong Gao, Singapore (SG); Sha Cao, Singapore (SG)

(73) Assignee: JUPITER PALACE PTE. LTD., Singapore (SG)

( * ) Notice: Subject to any disclaimer, the term of this patent is extended or adjusted under 35 U.S.C. 154(b) by 620 days.

(21) Appl. No.: 17/056,591

(22) PCT Filed: May 5, 2019

(86) PCT No.: PCT/CN2019/085512
§ 371 (c)(1),
(2) Date: Nov. 18, 2020

(87) PCT Pub. No.: WO2019/223514
PCT Pub. Date: Nov. 28, 2019

(65) Prior Publication Data
US 2021/0211559 A1    Jul. 8, 2021

(30) Foreign Application Priority Data
May 24, 2018    (CN) ......................... 201810508080.X

(51) Int. Cl.
*H04N 5/272*    (2006.01)
*H04N 5/222*    (2006.01)
(Continued)

(52) U.S. Cl.
CPC ............ *H04N 5/272* (2013.01); *G06T 7/194* (2017.01); *G06T 11/00* (2013.01); *G06V 10/25* (2022.01);
(Continued)

(58) Field of Classification Search
CPC ... G06T 7/10–194; G06T 2207/20112–20168; G06T 7/11;
(Continued)

(56) References Cited

U.S. PATENT DOCUMENTS

| 2013/0064465 A1* | 3/2013 | Tin | G06T 7/11 |
| | | | 382/248 |
| 2018/0040106 A1* | 2/2018 | Sun | G06T 13/00 |
| 2019/0138816 A1* | 5/2019 | Li | G06V 20/46 |

FOREIGN PATENT DOCUMENTS

| CN | 102820012 A | 12/2012 |
| CN | 103685878 A | 3/2014 |

(Continued)

OTHER PUBLICATIONS

International Search Report/Written Opinion dated Aug. 6, 2019 in related/corresponding PCT Application No. PCT/CN2019/085512.
(Continued)

*Primary Examiner* — Diane M Wills
(74) *Attorney, Agent, or Firm* — PATENT PORTFOLIO BUILDERS PLLC

(57) ABSTRACT

A method and an apparatus for making a ghosting special effect for a movie, an electronic device, and a medium, related to the field of computer application. The method comprises converting frames at specified moments in a to-be-processed movie into to-be-processed images; performing background removing operations on the to-be-processed images to obtain target object images corresponding to the specified moments in the to-be-processed movie; integrating the target object images into the to-be-processed movie, wherein each of the target object images is placed on its original position in the to-be-processed movie; and setting a continuous display period for each of the target object images in the to-be-processed movie.

11 Claims, 6 Drawing Sheets

(51) Int. Cl.
*G06T 11/00* (2006.01)
*G06T 7/194* (2017.01)
*G06V 10/25* (2022.01)
*G06V 10/764* (2022.01)
*G06V 10/82* (2022.01)
*G06V 10/26* (2022.01)

(52) U.S. Cl.
CPC .......... *G06V 10/267* (2022.01); *G06V 10/764* (2022.01); *G06V 10/82* (2022.01); *H04N 5/2226* (2013.01); *G06T 2207/10016* (2013.01); *G06T 2207/20084* (2013.01)

(58) Field of Classification Search
CPC . G06T 2207/10016; G06T 2207/20081; G06T 2207/20084; H04N 5/272; H04N 5/2228; G06V 10/267; G06V 10/25; G06V 10/764; G06V 10/82; G06F 18/214
See application file for complete search history.

(56) References Cited

FOREIGN PATENT DOCUMENTS

| | | |
|---|---|---|
| CN | 104539853 A | 4/2015 |
| CN | 104766361 A | 7/2015 |
| CN | 105593924 A | 5/2016 |
| CN | 106658035 A | 5/2017 |
| CN | 106911936 A | 6/2017 |
| CN | 107295272 A | 10/2017 |
| CN | 107333056 A | 11/2017 |
| CN | 107547804 A | 1/2018 |
| CN | 108717701 A | 10/2018 |
| CN | 108055477 B | 8/2020 |
| JP | 2013106224 A | 5/2013 |
| WO | 2007042075 A1 | 4/2007 |

OTHER PUBLICATIONS

Liu, Yi; "Analysis on the Application of Computer Technology in Film Post-processing", Administration of Press, Publication, Radio Film and Television of Jiangsu Province; Jun. 30, 2015; pp. 115-118.

Zhang, Dingfeng;"The use of special effects of Mask in AE—production of afterimage effects in martial arts films", Computer Knowledge and Technology, vol. 10,; Apr. 30, 2005; pp. 42-43.

Notification on Grant of Patent Right for Invention of the Priority in corresponding/related Chinese Application No. 201810508080.X dated Feb. 4, 2021.

* cited by examiner to-be-processed image　　　　　　target object image

METHOD AND APPARATUS FOR MAKING GHOSTING SPECIAL EFFECT FOR MOVIE, AND ELECTRONIC DEVICE AND MEDIUM

The present application is a U.S. National Stage of PCT/CN2019/085512 filed May 5, 2019, which claims the priority to a Chinese patent application No. 201810508080.X, filed with the China National Intellectual Property Administration on May 24, 2018 and entitled "method and apparatus for making ghosting special effect for movie, and electronic device and medium", which are incorporated herein by reference in their entirety.

TECHNICAL FIELD

The present application relates to the field of computer technology, in particular to a method and an apparatus for making a ghosting special effect for a movie, an electronic device and a storage medium.

BACKGROUND

After light stimuli ceases, the resulting visual sensation may sustain on retina for some time. This is referred to as ghosting effect, which may find application in video presentation. For example, a moving object in a video may still be visible to a user for a period, while it would have been supposed to disappear from the video. In another example, the object may be visible before it would have been supposed to. For example, the object in the video is in motion during seconds 1~20. Typically, The image of the object for second 10 is supposed to be displayed at second 10. However, with ghosting special effect applied, the image that is supposed to be displayed at second 10 may be able to be continuously displayed from the second 0 to second 10.

At present, the ghosting special effect may be achieved in following way. A plurality of key frames of a movie are firstly selected. A background removing operation is implemented on each of the frames through a movie synthesis software. The background-removed images are then synthesized into a movie by means of the movie synthesis software. Therefore, instead of being automatically implemented, the ghosting special effect making process requires complex manual operations.

SUMMARY

Embodiments of the present application provide a method and an apparatus for making a ghosting special effect for a movie, an electronic device, and a medium. Ghosting special effects for a movie can be automatically generated.

Following solutions are provided.

In a first aspect, an embodiment of the present application provides a method for making ghosting special effect for a movie, comprising:
  converting frames at specified moments in a to-be-processed movie into to-be-processed images;
  performing background removing operations on the to-be-processed images to obtain target object images corresponding to the specified moments in the to-be-processed movie;
  integrating the target object images into the to-be-processed movie, wherein each of the target object images is placed on its original position in the to-be-processed movie; and
  setting a continuous display period for each of the target object images in the to-be-processed movie.

In one possible implementation, performing background removing operations on the to-be-processed images to obtain target object images corresponding to the specified moments in the to-be-processed movie comprises:
  determining categories of target objects in the to-be-processed images by means of deep learning semantic image segmentation technology; and
  removing pixels other than pixels of the target objects from the to-be-processed images, so as to obtain target object images corresponding to the specified moments in the to-be-processed movie.

In one possible implementation, each of the target object images has a continuous display period beginning from a first moment of the to-be-processed movie and ending at its corresponding specified moment in the movie.

In another possible implementation, each of the target object images has a continuous display period beginning from its corresponding specified moment in the to-be-processed movie and ending at a second moment of the movie.

In one possible implementation, the first moment is the starting moment of the to-be-processed movie.

In one possible implementation, the second moment is the ending moment of the to-be-processed movie.

In a second aspect, an embodiment of the present application provides an apparatus for making a ghosting special effect for a movie, comprising:
  a conversion module, configured for converting frames at specified moments in a to-be-processed movie into to-be-processed images;
  a background removing module, configured for performing background removing operations on the to-be-processed images from the conversion module to obtain target object images corresponding to the specified moments in the to-be-processed movie;
  an integration module, configured for integrating the target object images generated by the background-removing module into the to-be-processed movie, wherein each of the target object images is placed on its original position in the to-be-processed movie; and
  a setting module, configured for setting a continuous display period for each of the target object images generated by the background removing module in the to-be-processed movie.

In one possible implementation, the background removing module is further configured for determining categories of target objects in the to-be-processed images by means of deep learning semantic image segmentation technology; and removing pixels other than pixels of the target objects from the to-be-processed images, so as to obtain target object images corresponding to the specified moments in the to-be-processed movie.

In one possible implementation, each of the target object images has a continuous display period beginning from a first moment of the to-be-processed movie and ending at its corresponding specified moment in the movie.

In another possible implementation, each of the target object images has a continuous display period beginning from its corresponding specified moment in the to-be-processed movie and ending at a second moment of the movie.

In one possible implementation, the first moment is the starting moment of the to-be-processed movie.

In one possible implementation, the second moment is the ending moment of the to-be-processed movie.

In a third aspect, an embodiment of the present application provides an electronic device, comprising a processor, a communication interface, a memory, and a communication bus, wherein the processor, the communication interface and the memory communicate with each other through the communication bus.

The memory is configured for storing computer programs.

The processor is configured for executing the computer program stored in the memory, so as to perform any of the method steps described in the first aspect.

In a forth aspect, an embodiment of the present application provides a computer-readable storage medium, having stored thereon a computer program that, upon executed by a processor, causes the processor to perform any of the method described in the first aspect.

In a fifth aspect, an embodiment of the present application provides a computer program product containing instructions that, upon executed on a computer, cause the computer to perform any one of method steps described in the first aspect.

Obviously, any product or method of the present application does not necessarily need to achieve all the advantages described above simultaneously.

BRIEF DESCRIPTION OF THE DRAWINGS

In order to more clearly describe the technical solutions of the embodiments of the present application and of the prior art, accompanying drawings that need to be used in embodiments and in the prior art will be briefly described below. Obviously, accompanying drawings described below are for only some of embodiments of the present application; those skilled in the art may also obtain other accompanying drawings based on these accompanying drawings without any creative efforts.

DETAILED DESCRIPTION

The technical solutions in the embodiments of the present application will be clearly and completely described below in conjunction with the drawings in the embodiments of the present application. Obviously, the described embodiments are only a part of the embodiments of the present application, rather than all of the embodiments. Based on the embodiments in the application, all other embodiments obtained by those ordinary skilled in the art without creative work shall fall within the protection scope of this application.

Figure 1:
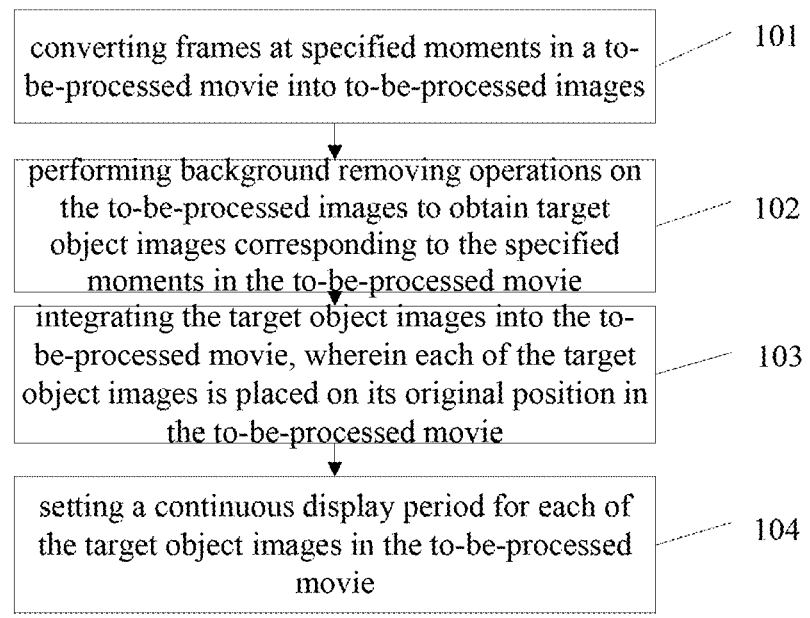
FIG. 1 is a flowchart of a method for making a ghosting special effect for a movie according to an embodiment of the application.

In order to realize the automatic generation of a ghosting special effect, an embodiment of the present application provides a method for making the ghosting special effect for a movie. The method may be executed by an electronic device capable of image processing. As shown in FIG. 1, the method includes the following operations.

At S101, frames at specified moments in a to-be-processed movie are converted into to-be-processed images.

The to-be-processed movie in the embodiment of the present application is a movie containing a moving object. The specified moment is preset by a user according to his desired ghosting special effect in a movie.

Figure 2:
FIG. 2 is an exemplary schematic diagram of a to-be-processed image according to the embodiment of the application.
Figure 3:
FIG. 3 is an exemplary schematic diagram of another to-be-processed image according to the embodiment of the application.
Figure 4:
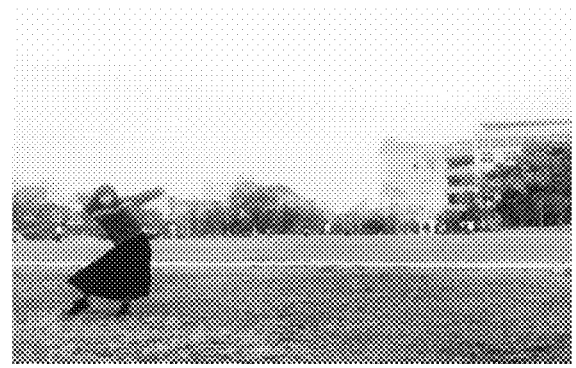
FIG. 4 is an exemplary schematic diagram of another to-be-processed image according to the embodiment of the application.

For example, the to-be-processed movie may be a 15-second movie, in which a person walks from right to left. Frames at the seconds 4, 8 and 12 may be selected and converted into the to-be-processed images. For example, a to-be-processed image corresponding to the frame at second 4 in the movie is shown in FIG. 2, a to-be-processed image corresponding to the frame at second 8 in the movie is shown in FIG. 3, and a to-be-processed image corresponding to the frame at second 12 in the movie is shown in FIG. 4.

At S102, background removing operations are performed on the to-be-processed images to obtain target object images corresponding to the specified moments in the to-be-processed movie.

The background removing operation may include: determining categories of target objects in the to-be-processed images by means of deep learning semantic image segmentation technology; and removing pixels other than pixels of the target objects from the to-be-processed images, so as to obtain target object images corresponding to the specified moments in the to-be-processed movie.

The semantic image segmentation refers to segmenting pixels in an image into different categories according to semantic expressions. For example, people, trees, vehicles, etc. in the image can be identified through semantic image segmentation technology.

In embodiments of the present application, a convolutional neural network may be applied to the semantic image segmentation technology. A deep learning model for the semantic image segmentation is obtained through pre-training. To-be-processed images are then input into the deep learning model to obtain categories of objects in the to-be-processed images.

Figure 5:
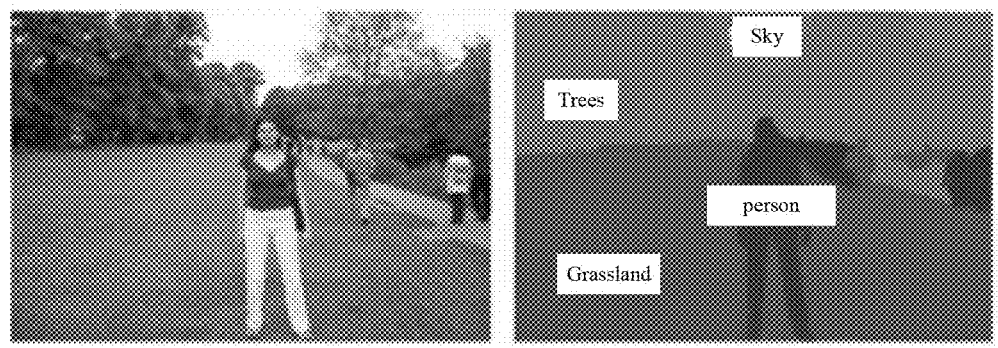
FIG. 5 is an exemplary schematic diagram of a background removing operation according to the embodiment of the application.

In the example as shown in FIG. 5, the to-be-processed image on the left is determined, by means of deep learning semantic image segmentation technology, as including sky, trees, person and grassland. As shown on the right of FIG.

5, assuming that the target object is a person, then pixels other than those for the person in the image are removed.

Figure 6:
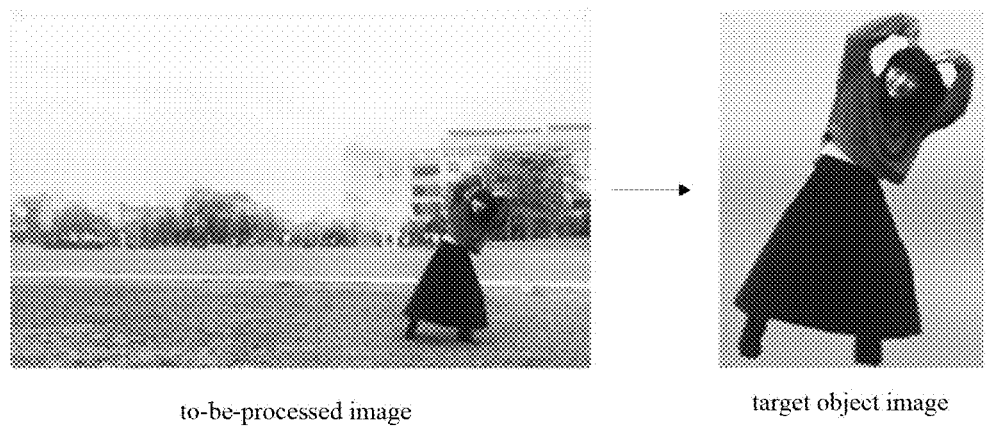
FIG. 6 is an exemplary schematic diagram of a target object image according to the embodiment of the application.
Figure 7:
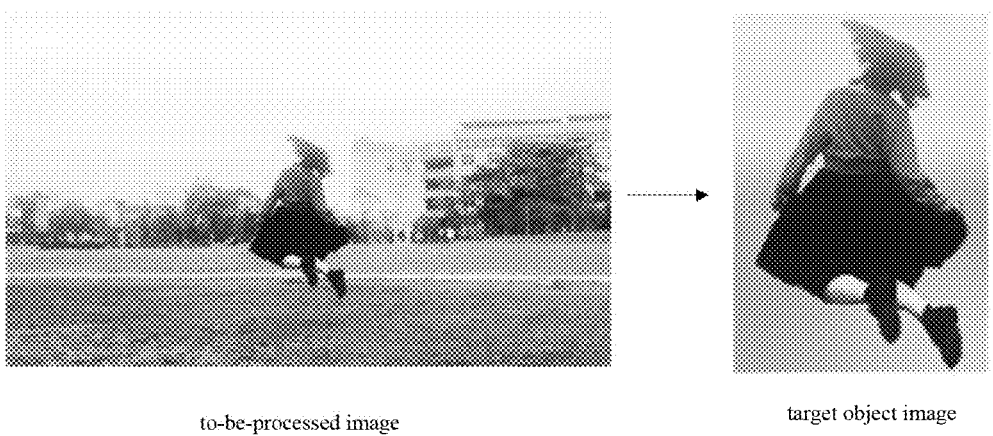
FIG. 7 is an exemplary schematic diagram of another target object image according to the embodiment of the application.
Figure 8:
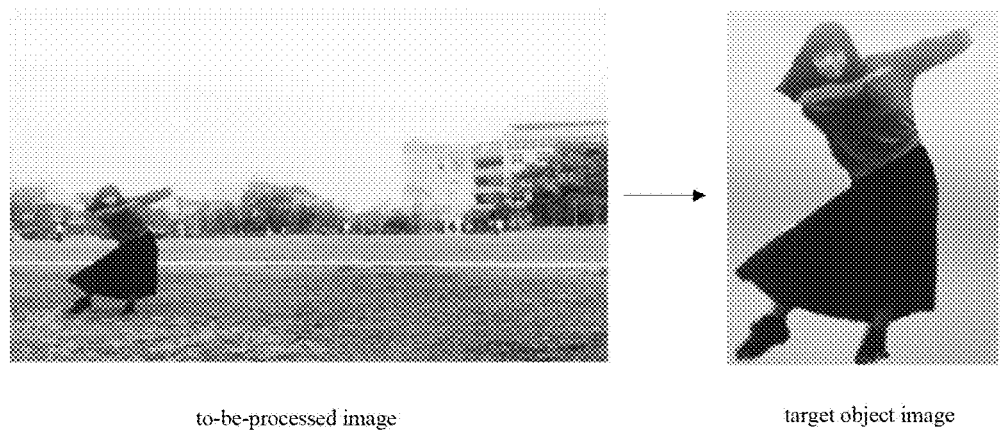
FIG. 8 is an exemplary schematic diagram of another target object image according to the embodiment of the application.

FIGS. 6-8 illustrate respectively background-removed images for the to-be-processed images in FIGS. 2-4.

In accordance with FIGS. 2-4, FIGS. 6-8 are respectively the images of the target object corresponding to seconds 4, 8 and 12 in the to-be-processed movie.

At S103, the target object images are integrated into the to-be-processed movie, wherein each of the target object images is placed on its original position in the to-be-processed movie.

Target object images can be integrated into the to-be-processed movie, with each of the target object images being placed on its original position in the to-be-processed movie through image cutting and pasting technology. For example, after integration, target object image in FIG. 6 is placed on the original position of the frame at second 4 in the to-be-processed movie, the target object image in FIG. 7 is on the original position of the frame at second 8 in the to-be-processed movie, and the target object image in FIG. 8 is on the original position of the frame at second 12 in the to-be-processed movie.

At S104, a continuous display period is set for each of the target object images in the to-be-processed movie.

In one possible implementation, each of the target object images has a continuous display period beginning from the first moment of the to-be-processed movie and ending at its corresponding specified moment in the movie.

Optionally, the first moment is the starting moment of the to-be-processed movie, i.e., the $0^{th}$ second.

Alternatively, the first moment may be any moment earlier than the specified moment for the target object image. For example, if the specified moment for a first target object image is at the $4^{th}$ second, then the first moment may also be set at the $1^{st}$ second, the $2^{nd}$ second or the $3^{rd}$ second.

Optionally, each of the target object images is assigned with a first moment. That is, the initial display moments of the target object images may be different. For example, the continuous display period for the target object image in FIG. 6 is from the $1^{st}$ second to the $4^{th}$ second, and the continuous display period for the target object image in FIG. 7 is from the $3^{rd}$ second to the $8^{th}$ second, and the continuous display period for the target object image in FIG. 8 is from the $7^{th}$ second to the $12^{th}$ second.

Figure 9:
FIG. 9 is a schematic diagram of a display effect of the ghosting special effect for a movie according to the embodiment of the application.

Continuing with above example with the $0^{th}$ second in the to-be-processed movie as the first image, that is, the continuous display period for the target object image in FIG. 6 is from the $0^{th}$ second to the $4^{th}$ second, the continuous display period for the target object image in FIG. 7 is from the $0^{th}$ second to the $8^{th}$ second, and the continuous display period for the target object image in FIG. 8 is from the $0^{th}$ second to the $12^{th}$ second. After above processing on the to-be-processed movie, a movie with ghosting is generated. The frame at the start moment of the movie with ghosting is shown in FIG. 9. The rightmost person in FIG. 9 is from the person image at the start moment of the original movie, the second person from right to left is from the person image at the $4^{th}$ second frame of the original movie, the third person from right to left is from the person image in the $8^{th}$ second frame of the original movie, and the fourth person from right to left is from the person image at the $12^{th}$ second frame in the original movie.

At the starting moment of the movie with ghosting, the target object images corresponding to the moments as specified in the above processing are all displayed. As the movie proceeds, the persons in FIG. 9 disappear from right to left sequentially. For example, after the $0^{th}$ second, the rightmost person in FIG. 9 disappears; after the $4^{th}$ second, the second person from the right in FIG. 9 disappears; after the $8^{th}$ second, the third person from the right in FIG. 9 disappears; and after the $12^{th}$ second, the fourth person from the right in FIG. 9 disappears.

Figure 10:
FIG. 10 is a schematic diagram of another display effect of the ghosting special effect for a movie according to the embodiment of the application.
Figure 11:
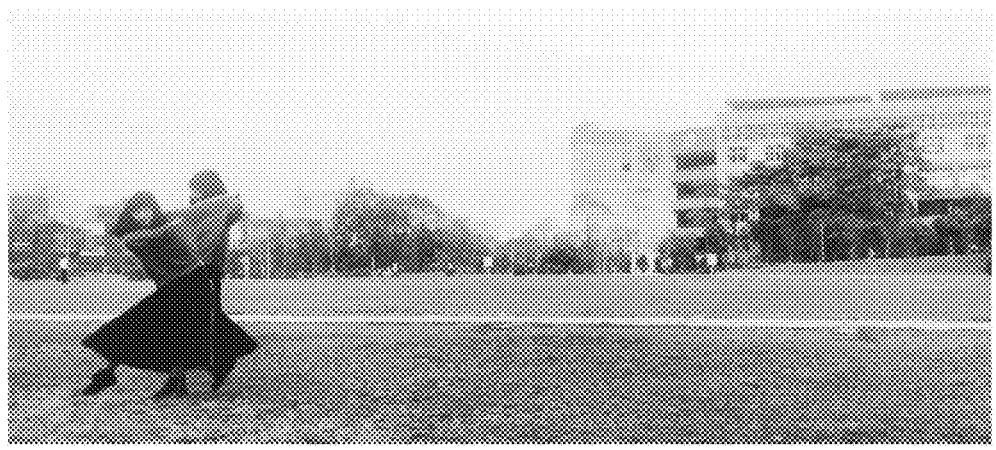
FIG. 11 is a schematic diagram of a further display effect of the ghosting special effect for a movie according to the embodiment of the application.

For example, the $8^{th}$ second frame in the movie with ghosting is shown in FIG. 10, and the $12^{th}$ second frame in the movie with ghosting is shown in FIG. 11.

In another possible implementation, each of the target object images has a continuous display period beginning from its corresponding specified moment in the to-be-processed and ending at a second moment in the to-be-processed movie.

Optionally, the second moment is the ending moment of the to-be-processed movie, e.g., the $15^{th}$ second.

Alternatively, the second moment may also be any other moment later than the specified moment for the target object image. For example, if the specified moment for the last target object image is the $12^{th}$ second, then the second moment may also be set as the $13^{th}$ second, the $14^{th}$ second, or the $15^{th}$ second.

Optionally, each of the target object image may be assigned with a second moment, that is, the ending display moments for target object images may be different. For example, the continuous display period for the target object image in FIG. 6 is from the $4^{th}$ second to the $9^{th}$ second, the continuous display period for the target object image in FIG. 7 is from the $8^{th}$ second to $13^{th}$ second, and the continuous display period for the target object image in FIG. 8 is from the $12^{th}$ second to the $15^{th}$ second.

By means of this method, frames at specified moments in a to-be-processed movie are converted into to-be-processed images; background removing operations are performed on the to-be-processed images to obtain target object images corresponding to the specified moments in the to-be-processed movie; the target object images are integrated into the to-be-processed movie, wherein each of the target object images is placed on its original position in the to-be-processed movie; and a continuous display period is set for each of the target object images in the to-be-processed movie. The entire processing procedure requires no manual participation, and the ghosting special effect for a movie can be realized by setting the continuous display periods for the target object images in the to-be-processed movie. As such, automatic generation of the ghosting special effect can be realized through the embodiments of the present application.

Figure 12:
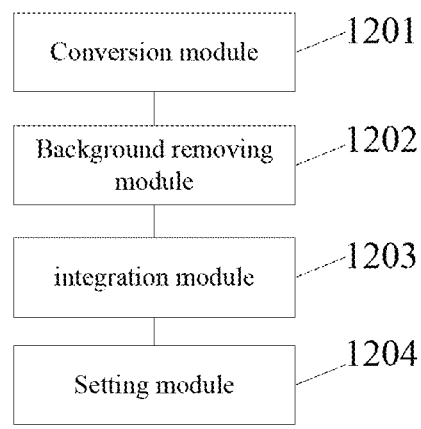
FIG. 12 is a schematic structural diagram of an apparatus for making a ghosting special effect for a movie according to an embodiment of the application.
Figure 13:
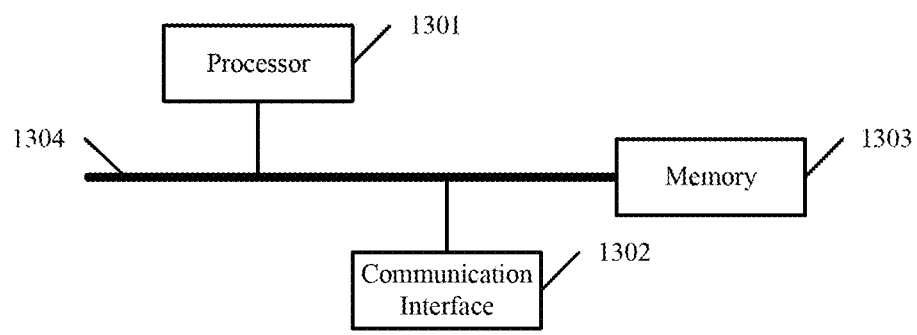
FIG. 13 is a schematic structural diagram of an electronic device according to an embodiment of the application.

In correspondence with the above method embodiment, as shown in FIG. 12, an embodiment of the present application further provides an apparatus for making a ghosting special effect for a movie, comprising: a conversion module 1201, a background removing module 1202, an integration module 1203 and a setting module 1204.

The conversion module 1201 is configured for converting frames at specified moments in a to-be-processed movie into to-be-processed images.

The background removing module 1202 is configured for performing background removing operations on the to-be-processed images from the conversion module to obtain target object images corresponding to the specified moments in the to-be-processed movie.

The integration module 1203 is configured for integrating the target object images generated by the background-removing module into the to-be-processed movie, wherein each of the target object images is placed on its original position in the to-be-processed movie.

The setting module 1204 is configured for setting a continuous display period for each of the target object images generated by the background removing module in the to-be-processed movie.

Optionally, each of the target object images has a continuous display period beginning from a first moment of the to-be-processed movie and ending at its corresponding specified moment in the movie.

Alternatively, each of the target object images has a continuous display period beginning from its corresponding specified moment in the to-be-processed movie and ending at a second moment of the movie.

The first moment is the starting moment of the to-be-processed movie.

The second moment is the ending moment of the to-be-processed movie.

In one possible implementation, the background removing module 1202 is specifically configured for determining categories of target objects in the to-be-processed images by means of deep learning semantic image segmentation technology; and removing pixels other than pixels of the target objects from the to-be-processed images, so as to obtain target object images corresponding to the specified moments in the to-be-processed movie.

An embodiment of the application further provides an electronic device, comprising a processor 1301, a communication interface 1302, a memory 1303, and a communication bus 1304, wherein the processor 1301, the communication interface 1302 and the memory 1303 communicate with each other through the communication bus 1304.

The memory 1303 is configured for storing a computer programs.

The processor 1301 is configured for executing the computer programs stored in the memory 1303, so as to perform the following method steps:

converting frames at specified moments in a to-be-processed movie into to-be-processed images;

performing background removing operations on the to-be-processed images to obtain target object images corresponding to the specified moments in the to-be-processed movie;

integrating the target object images into the to-be-processed movie, wherein each of the target object images is placed on its original position in the to-be-processed movie; and setting a continuous display period for each of the target object images in the to-be-processed movie.

The program may further cause the processor to perform other processing procedures described in the above method embodiments for making the ghosting special effect for a movie, the detail of which is not repeated here.

The communication bus in the above electronic device may be a Peripheral Component Interconnect (PCI) bus or an Extended Industry Standard Architecture (EISA) bus and the like. The communication bus may include an address bus, a data bus, a control bus, and the like. For ease of presentation, the communication bus is denoted by a thick line in the drawings. However, this does not mean that there is only one bus or one type of bus.

The communication interface is used for communication between the above electronic device and other devices.

The memory may be a Random Access Memory (RAM) or a Non-Volatile Memory (NVM). At least one disk storage may also be included in the device. Optionally, the memory may also be at least one storage device remote from the aforementioned processor.

The above processor may be a general-purpose processor, such as a Central Processing Unit (CPU) or a Network Processor (NP); or a Digital Signal Processing (DSP) device, an Application Specific Integrated Circuit (ASIC), a Field-Programmable Gate Array (FPGA) or other programmable logic device, discrete gate or transistor logic device, discrete hardware component.

A further embodiment according to the present application further provides a computer-readable storage medium, having stored thereon a computer program which, when executed by a processor, causes the processor to perform any of the method steps described in the above embodiments of making the ghosting special effect for a movie.

A further embodiment according to the present application provides a computer program product containing instructions that, when executed on a computer, causes the computer to perform any of the methods for making the ghosting special effect for a movie described in above embodiments.

Above embodiments may be fully or partially embodied in software, hardware, firmware, or any combination thereof. When implemented by software, all or part of the embodiments may be implemented in the form of a computer program product. The computer program product includes one or more computer instructions. When the computer program instructions are loaded and executed on a computer, the procedures or functions described in accordance with the embodiments of the present application will take place in whole or in part. The computer may be a general purpose computer, a special purpose computer, a network of computers, or other programmable device. The computer instructions may be stored in a computer-readable storage medium or transmitted from one computer-readable storage medium to another computer-readable storage medium, for example, the computer instructions may be transmitted from one website, computer, server, or data center to another website, computer, server, or data center via wired (e.g., coaxial cable, fiber optic, Digital Subscriber Line (DSL)) or wireless (e.g., infrared, wireless, microwave, etc.) means. The computer-readable storage medium may be any usable medium that can be accessed by a computer or a data storage device, such as an integrated server, an integrated data center, etc., that includes one or more usable media. The usable media may be a magnetic media (e.g., floppy Disk, hard Disk, magnetic tape), an optical media (e.g., DVD), or a semiconductor media (e.g., Solid State Disk (SSD)), among others.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

Each embodiment in this specification is described in a related manner, and the same or similar parts between the various embodiments can be referred to each other. Each embodiment focuses on the differences from other embodiments. In particular, as for embodiments of electronic device, readable storage medium and computer program product, since they are basically similar to the method embodiment, the description is relatively simple, and the relevant part may refer to the description of the method embodiment.

The above descriptions are merely preferred embodiments of the present application, and are not intended to limit the protection scope of the present application. Any modification, equivalent replacement, and improvement made within the spirit and principle of this application fall within the protection scope of this application.

What is claimed is:

1. A method for making a ghosting special effect in a movie, comprising:
   converting frames at specified moments in a to-be-processed movie into to-be-processed images;
   performing background removing operations on the to-be-processed images to obtain target object images corresponding to the specified moments in the to-be-processed movie;
   integrating the target object images into the to-be-processed movie, wherein each of the target object images is placed on its original position in the to-be-processed movie; and
   setting a continuous display period for each of the target object images in the to-be-processed movie, wherein each of the target object images has a continuous display period beginning from a first moment of the to-be-processed movie and ending at its corresponding specified moment in the movie.

2. The method according to claim 1, wherein performing background removing operations on the to-be-processed images to obtain target object images corresponding to the specified moments in the to-be-processed movie comprises:
   determining categories of target objects in the to-be-processed images by means of deep learning semantic image segmentation technology; and
   removing pixels other than pixels of the target objects from the to-be-processed images, so as to obtain target object images corresponding to the specified moments in the to-be-processed movie.

3. The method according to claim 1, wherein
   each of the target object images has a continuous display period beginning from its corresponding specified moment in the to-be-processed movie and ending at a second moment of the movie.

4. The method of claim 3, wherein the second moment is the ending moment of the to-be-processed movie.

5. The method of claim 1, wherein the first moment is the starting moment of the to-be-processed movie.

6. An electronic device, comprising a processor, a communication interface, a memory, and a communication bus, wherein the processor, the communication interface and the memory communicate with each other through the communication bus;
   the memory is configured for storing a computer program; and
   the processor is configured for executing the computer program stored in the memory, so as to perform a method for making a ghosting special effect in a movie, comprising:
   converting frames at specified moments in a to-be-processed movie into to-be-processed images;
   performing background removing operations on the to-be-processed images to obtain target object images corresponding to the specified moments in the to-be-processed movie;
   integrating the target object images into the to-be-processed movie, wherein each of the target object images is placed on its original position in the to-be-processed movie; and
   setting a continuous display period for each of the target object images in the to-be-processed movie, wherein each of the target object images has a continuous display period beginning from a first moment of the to-be-processed movie and ending at its corresponding specified moment in the movie.

7. The electronic device of claim 6, wherein the processor is configured to:
   determine categories of target objects in the to-be-processed images by means of deep learning semantic image segmentation technology; and
   remove pixels other than pixels of the target objects from the to-be-processed images, so as to obtain target object images corresponding to the specified moments in the to-be-processed movie.

8. The electronic device according to claim 6, wherein each of the target object images has a continuous display period beginning from its corresponding specified moment in the to-be-processed movie and ending at a second moment of the movie.

9. The electronic device of claim 8, wherein the second moment is the ending moment of the to-be-processed movie.

10. The electronic device of claim 6, wherein the first moment is the starting moment of the to-be-processed movie.

11. A non-transitory computer-readable storage medium, having a computer program stored thereon which, when executed by a processor, causes the processor to perform method steps of claim 1.

* * * * *